US011548982B2

United States Patent
Klingler et al.

(12) United States Patent
(10) Patent No.: US 11,548,982 B2
(45) Date of Patent: Jan. 10, 2023

(54) ACTIVE BIOCIDAL SUBSTANCES AND PRODUCTION PROCESS THEREOF

(71) Applicant: Marwian GmbH, Vienna (AT)

(72) Inventors: Martin Klingler, Vienna (AT); Esther Knittl, Vienna (AT)

(73) Assignee: Marwian GmbH, Vienna (AT)

( * ) Notice: Subject to any disclaimer, the term of this patent is extended or adjusted under 35 U.S.C. 154(b) by 16 days.

(21) Appl. No.: 16/413,637

(22) Filed: May 16, 2019

(65) Prior Publication Data
US 2020/0362110 A1   Nov. 19, 2020

(51) Int. Cl.
*C08G 73/02*   (2006.01)
*A01N 33/08*   (2006.01)

(52) U.S. Cl.
CPC ......... *C08G 73/0206* (2013.01); *A01N 33/08* (2013.01)

(58) Field of Classification Search
CPC .................................................... C08G 73/00
See application file for complete search history.

(56) References Cited

U.S. PATENT DOCUMENTS

| | | | |
|---|---|---|---|
| 2003/0031644 A1* | 2/2003 | Fitzpatrick | A61K 31/787 424/78.36 |
| 2009/0130052 A1* | 5/2009 | Schmidt | A61K 31/155 424/78.37 |
| 2009/0182118 A1* | 7/2009 | Nyzhnyk | A61Q 19/00 528/422 |
| 2015/0368193 A1* | 12/2015 | Pretsch | A61P 31/12 514/634 |

OTHER PUBLICATIONS

Albert et al. Biomacromolecules Year 2003, 4, 1811-1817.*
"Stably Transfected Human Estrogen Receptor-α Transactivation Assay for Detection of Estrogenic Agonist and Antagonist Activity of Chemicals using the ERα CALUX cell line," Annex 4, OECD/OCDE 455, 2016, 15 pages.
"Regulation (EU) No. 528/2012 of the European Parliament and of the Council of May 22, 2012, concerning the making available on the market and use of biocidal products," Official Journal of the European Union, Jun. 27, 2012, pp. 1-123.

* cited by examiner

*Primary Examiner* — Ana Z Muresan
(74) *Attorney, Agent, or Firm* — Dave Law Group LLC; Raj S. Dave (57) ABSTRACT

An embodiment relates to a substance comprising an end-capped amino compound comprising an amino compound and at least a portion of an end capping agent, wherein the at least the portion of the end capping agent contains no primary alkyl amine group and wherein the substance exhibits no activity as measured by: (a) a Cytotox CALUX assay; (b) a Steroidogenesis ERα CALUX assay; (c) a AR CALUX assay; (d) a Anti ERrα CALUX assay; (e) a Steroidogenesis AR CALUX assay; (f) an anti-AR CALUX assay; (g) a TRβ CALUX assay; (h) a anti-TRβ CALUX assay; (i) a TTR-TRβ CALUX assay; or (j) a TPO assay.

12 Claims, 3 Drawing Sheets

ACTIVE BIOCIDAL SUBSTANCES AND PRODUCTION PROCESS THEREOF

FIELD OF THE INVENTION

The invention relates to novel active substances and their production process. Those active substances can primarily be used for biocidal products, plant protection products, medical devices and pharmacological uses. The herein described active substances are obtained by a condensation reaction. By meeting modern regulatory requirements with respect to antimicrobial efficacy, human health and environmental hazards, the subject of the present invention is commercially viable for technical applications.

BACKGROUND OF INVENTION

In 1940, the patent U.S. Pat. No. 2,325,586 set the course for the development in the field of polymeric guanidines and their application as biocidal active substances. These polymeric guanidine salts are formed by a polymeric condensation reaction of organic compounds, bearing two amino groups with at least one free hydrogen atom. Cyanogen halides, monomeric guanidines, guanidino acid esters, dicyanamides and isocyanide dihalides can be taken into account as monomers for the formation of the herein described polymeric compounds. Since a condensation reaction is described here, water-free conditions are mandatory to achieve a good yield. As it is evident from the relevant examples of the U.S. Pat. Nos. 2,325,586 and 2,336,605, for the polymerization reaction of hexamethylene diamine (HMDA) and cyanogen bromide in ethanol not only absolute solvents have to be used, but also the required solvent amount is very high. The polymerization is carried out for 25 hours at reflux conditions, which reduces the efficiency of the whole process.

From all polymeric guanidines known, merely polyhexamethylene biguanide (PHMB) carries relevance as an active substance today. This substance was first described in detail in the patent in 1950. Today, PHMB is commonly known as polyhexanide, Vantocil or simply PHMB with different molecular weights.

In addition, a number of polymeric guanidines are known, which can be produced by using different di- and polyamines, such as unbranched C6-C12 alkylene diamines, which are known from the EP Patent numbers 0439698 and 0439699.

In WO 1999/054291, a production process of polyhexamethylene guanidine (PHMG) is described. PHMG can be used as an active substance for biocidal products. PHMG is prepared by a polycondensation of guanidine with an alkylene diamine in particular hexamethylene diamine. From WO 2001/085676 A1, a polymeric guanidine is known, which is prepared by the condensation reaction of guanidine and an oxyalkylene diamine. For the preparation of this polymer, guanidinium hydrochloride is dissolved in triethylene glycol diamine. The molecular weight of this was determined to be up to 3000 Da.

From WO2006/047800 A1, a polymeric condensation product is known, which is formed by reacting guanidine with an alkylene diamine and an oxyalkylene diamine. The condensation product is characterized according to its claims by the amino groups of the alkylene diamine and/or the oxyalkylene diamine being terminal.

Due to changes in the society and the recent requirements that an active substance needs to meet, most inventions in this field lost relevance. In 2010, an association, working in the chemical and biocidal products business, stated the needs for new developments of active substances in this field: "However, despite the growing number of applications the number of available biocide chemistries i.e. Active Substances (AS) is decreasing in the European Union (EU) concurrent with the implementation of the Biocidal Product Directive. [ . . . ] Emerging regulatory initiatives in the EU are driving towards more environmentally safe chemicals, used as such or in a wide range of products and applications." See: Elina Kähkönen, Teemu Hirvonen, and Katrina Nordstrom. "New biocide active substances: needs and challenges in the EU as viewed by industry." Journal of Business Chemistry 7.2 (2010).

SUMMARY OF THE INVENTION

An embodiment relates to a substance comprising an end-capped amino compound comprising an amino compound and at least a portion of an end capping agent, wherein the at least the portion of the end capping agent contains no primary alkyl amine group and wherein the substance exhibits less cytotoxicity than without the end capping agent.

An embodiment relates to a substance comprising an end-capped amino compound comprising an amino compound and at least a portion of an end capping agent, wherein the at least the portion of the end capping agent contains no primary alkyl amine group and wherein the substance exhibits no activity as measured by a Cytotox CALUX assay.

An embodiment relates to a product formed by a reaction of reactants comprising an oxyalkylene diamine, an alkylene diamine, a guanidine or a salt thereof, and an end-capping agent, the reaction comprising a first step and a second step, wherein molar compositions of the reactants in the first step and the second step are different, further wherein the product has a lower cytotoxicity as measured by a Cytotox CALUX assay than that of a comparative product formed in just first step of the reaction.

An embodiment relates to a product formed by a reaction of reactants comprising an oxyalkylene diamine, an alkylene diamine, a guanidine or a salt thereof, and an end-capping agent, the reaction comprising a first step and a second step, wherein molar compositions of the reactants in the first step and the second step are different, further wherein the product has a cytotoxicity of less than 0.3 ng TBT eq./g sample as measured by a Cytotox CALUX assay.

An embodiment relates to a method comprising forming a product comprising an end-capped amino compound by reacting an amino compund and at least a portion of an end capping agent, wherein the product exhibits no cytotoxicity as measured by a Cytotox CALUX assay.

An embodiment relates to a method comprising forming a product by a reaction of reactants comprising an oxyalkylene diamine, an alkylene diamine, a guanidine or a salt thereof, and an end-capping agent, the reaction comprising a first step and a second step, wherein molar compositions of the reactants in the first step and the second step are different, further wherein the product has a lower cytotoxicity as measured by a Cytotox CALUX assay than that of a comparative product formed in just the first step of the reaction.

An embodiment relates to a method comprising forming a product by a reaction of reactants comprising an oxyalkylene diamine, an alkylene diamine, a guanidine or a salt thereof, and an end-capping agent, the reaction comprising a first step and a second step, wherein molar compositions of the reactants in the first step and the second step are different, further wherein the polymeric product has a cytotoxicity of less than 0.3 ng TBT eq./g sample as measured by a Cytotox CALUX assay.

In an embodiment, the substance further exhibits no activity as measured by a Steroidogenesis ERα CALUX assay.

In an embodiment, the substance further exhibits no activity as measured by a AR CALUX assay.

In an embodiment, the substance further exhibits no activity as measured by a Anti ERrα CALUX assay.

In an embodiment, the substance further exhibits no activity as measured by a Steroidogenesis AR CALUX assay.

In an embodiment, the substance further exhibits no activity as measured by an anti-AR CALUX assay.

In an embodiment, the substance further exhibits no activity as measured by a TRβ CALUX assay.

In an embodiment, the substance further exhibits no activity as measured by a anti-TRβ CALUX assay.

In an embodiment, the substance further exhibits no activity as measured by a TTR-TRβ CALUX assay.

In an embodiment, the substance further exhibits no activity as measured by a TPO assay.

In an embodiment, the amino compound comprises a linking agent.

In an embodiment, the amino compound comprises an organic amino compound and a linking agent.

In an embodiment, the organic amino compound comprises a first organic amine compound and a second organic amine compound, wherein the first organic amine compound and the second organic amine compound are different.

In an embodiment, the first organic amine compound comprises an alkylene diamine, the second organic amine compound comprises an oxyalkylene diamine, the linking agent comprises a guanidine or a salt thereof, and the end-capping agent comprises a guanidine or a salt thereof.

In an embodiment, the alkylene diamine comprises hexamethylenediamine, the oxyalkylene diamine comprises triethylene glycol diamine, the linking agent and the end-capping agent comprise guanidine hydrochloride.

In an embodiment, the oxyalkylene diamine comprises a compound of a formula:

$$NH_2[(CH_2)_2O]_n(CH_2)_2NH_2$$

wherein n is an integer between 2 and 5.

In an embodiment, the alkylene diamine comprises a compound of a formula:

$$NH_2(CH_2)_nNH_2$$

wherein n is an integer between 2 and 10.

In an embodiment, the salt comprises a hydrochloride salt of the guanidine.

In an embodiment, the oxyalkylene diamine comprises a triethylene glycol diamine, a polyoxypropylene diamine and/or a polyoxyethylene diamine.

In an embodiment, over 50% by weight of the product has the guanidine at a terminal position of the product.

In an embodiment, over 90% by weight of the product has the guanidine at a terminal position of the product.

In an embodiment, the product has a bactericidal activity and yeasticidal activity.

In an embodiment, the guanidine or the salt thereof is added in both the first step and the second step of the reaction.

In an embodiment, the end-capping agent comprises the guanidine or the salt thereof.

In an embodiment, a ratio of C to N (C/N) of the product is greater than 2.

In an embodiment, the product is microbiologically degradable.

In an embodiment, during the first step, the oxyalkylene diamine, the alkylene diamine and the guanidine or the salt thereof are in a stoichiometric ratio.

In an embodiment, during the first step, the oxyalkylene diamine, the alkylene diamine and the guanidine or the salt thereof are in a non-stoichiometric ratio, wherein the guanidine or the salt thereof is in excess of the stoichiometric ratio.

In an embodiment, during the second step, the oxyalkylene diamine, the alkylene diamine, the guanidine or a salt thereof, and the end-capping agent are in a non-stoichiometric ratio, wherein a total amount of the guanidine or the salt thereof and the end-capping agent is in excess of the stoichiometric ratio.

DETAILED DESCRIPTION

With the exception of one mentioned publication, none of the described polymeric guanidines carry relevant market significance as an active substance (AS). They lack a suitable substance profile with regards to the requirements for a modern active substance, used for biocidal products (BP) and other applications, like their use for plant protection or medical products. Nowadays, not only antimicrobial efficacy, which most of the publications are looking at, is important, but also human toxicology, endocrine disrupting (ED) properties, ecotoxicological effects and the biological degradation behaviour.

Hardly any publication is mentioning endocrine disrupting properties, its ecotoxicological profile nor biological degradation behaviour, since at the time of their publication, those parameters were not in the focus of the public and regulators, thus rendering most of the presented polymeric guanidines no longer viable for real life technical applications.

The Federal Insecticide, Fungicide, and Rodenticide Act (FIFRA) is a United States federal law that sets up the basic U.S. system of regulation to protect professional users, consumers, and the environment. It is administered and regulated by the United States Environmental Protection Agency (EPA).

The European Union (EU) put the Biocidal Products Regulation 528/2012 (BPR) in force in September 2013. It is administered and regulated by the European Chemical Agency (ECHA). Its aim is to safeguard the people living in the EU as well as the environment from a negative impact of biocides and other active substances, which are regulated under the BPR.

Both BPR and FIFRA do not only set the tone for their area of validity, but also for the other countries across the globe, which do not have their own regulatory bodies.

The objective of the invention is to produce active substances, which are superior to already existing polymeric guanidines. Superiority from previously published active substances are resulting from no significant endocrine disrupting properties, as well as lower mammalian and aquatic toxicity and a faster biodegradation process, combined with equal or higher antimicrobial efficacy. Only by creating active substances with a good combination of all these properties, a commercially relevant active substance can be made for the use in biocidal products and other applications under the most recent legislation.

To direct amine compounds towards desired properties, which today are mandatory for active substances, one can use an end capping agent to change the terminal function(s), which can have a significant impact on the behavior of amine-compounds. As an end-capping agent, all compounds are useable, which are capable of replacing a terminal amino group.

For the synthesis of polycondensation products, one can use an amino-compound with a linking agent to achieve a desired polycondensation product. As a linking agent, one can use any compound, which is capable to undergo a reaction with an amino-group in two positions, in order to form a polymeric compound by means of a condensation reaction. The so formed product may bear amine-groups in their terminal positions. As an additional step to the polycondensation reaction, an end capping agent is being introduced to direct the terminal functional groups and thus the properties of the final compounds, towards desired ones.

A polycondensation can be carried out with one, two or more different amines, which can be organic and/or inorganic.

A polycondensation product according to the disclosure, represents a significant step forward, compared to older structures, stated in the prior art section, especially when they are used in biocidal or plant protection products.

When considering a polycondensation product of guanidine as linking agent and alkylendiamines as amines, the following modifications can be postulated:
1. Molecular size, basic structure (linear or cyclic), possible cross-linking, molecular weight distribution.
2. Use of one single or multiple diamines as educts, the latter increasing the number of possible structures synthesized.
3. Basic stoichiometry of educts, as used for the condensation reaction.
4. Termination of polymer chains, either by:
   a) The linking agent, e.g. guanidine
   b) Amino-groups
   c) Other groups introduced by the use of end capping agents Surprisingly, it was found out that terminal amino groups give undesired results with respect to mammalian toxicity and most importantly, endocrine activity, the latter considered to be driving long-term toxicity (both for mammals and aquatic organisms).

On the other hand, it could be demonstrated, that very short-chained structures exhibit less pronounced antimicrobial efficacy.

Guanidine termination is also beneficial for antimicrobial efficacy of a cationic polymer, due to its more pronounced cationic charge.

Trying to achieve more guanidine terminated polymers by adding a stoichiometric surplus of guanidine at the very beginning of the production process, will inevitably result in shorter chain-lengths, which are detrimental to antimicrobial efficacy. Also, an excess of unreacted guanidine has to be avoided due to its unfavorable toxicological properties.

Therefore, the introduction of additional guanidine (as an example for a suitable end-capping agent) in an additional synthesis step turned out to be the most reasonable solution, to on the one hand obtain the desired chained length of the polymer, and on the other hand achieve a high degree of non-amino-terminated molecules.

Other terminating functional groups can be established at this second stage of synthesis too, by using a different end-capping agent than guanidine.

In an embodiment, the molecular weight of the condensation product in Dalton (Da) ranges between 200 Da and 3000 Da, with additional lower and/or upper limits of the molecular weights being 300 Da, 400 Da, 500 Da, 600 Da, 700 Da, 800 Da and 900 Da such that the molecular weight range can be anywhere from 100 Da as the lower limit and 3,000 Da as the upper limit.

In an embodiment, the majority of the polymeric chains by weight has the guanidine at a terminal position.

In an embodiment, over 50%, 60%, 70%, 80%, 90%, 95% or 99% by weight of the polymeric product has the guanidine at a terminal position of the polymeric product.

Definitions, General Techniques and Abbreviations

Unless otherwise defined herein, scientific and technical terms used in connection with an embodiment, shall have the meanings that are commonly understood by those of ordinary skill in the art. Further, unless otherwise required by context, singular terms shall include pluralities and plural terms shall include the singular. For example, the term "a" in a claim refers "one or more." Generally, nomenclatures used in connection with, and techniques of, health monitoring described herein are those well-known and commonly used in the art.

The phrase "exhibits substantially no activity" means that effects on an endocrine system of a vertebrate are (a) either below or close to the LOQ of in-vitro assays as measured by Cytotox CALUX assays or (b) do not lead to an adverse effect in the mammal.

The term "reaction" refers to a condition when a compound creating a chemical bond with another compound.

"Guanidine" is the compound with the formula $HNC(NH_2)_2$. It is a colorless solid, whose salts dissolve readily in polar solvents.

"Organic" means covalently bound carbon based compounds.

"Product" is the result of more than one starting materials of a reaction.

"Terminal" is the last chemical group at the end of a polymer chain.

"Biocide" is something which adversely affects (micro-) organism metabolism or virus multiplication.

"Degradable" refers to something that is susceptible to microorganism metabolism.

"Agent" is a compound with a special aim, i.e., bonding to the end of a polymer chain.

"Lower" means exhibiting less of something.

"Formed" refers to a product that is made as the result of more than starting materials of a reaction.

"Linking agent" is something that is serving to connect one part or thing or compound with another.

The term "compound" refers to a specific chemical structure. For example, a chemically distinct substance formed by union of two or more ingredients (as elements) in definite proportion by weight and with definite structural arrangement.

The term "terminal position" refers to the end of a polymer molecule.

The term "end capping agent" refers to a chemical entity that is capable of replacing an amino group at a terminal position of a compound.

The term "molecular weight" refers to the sum of the atomic weight values of the atoms in a molecule.

The term "group" refers to covalently bound aggregate of atoms in a given structure, exhibiting specific chemical properties.

The terms "first step," "second step," and additional steps refer to portions of a process.

TABLE 1

List of abbreviations

| Abbreviation | Full Form | Definition |
|---|---|---|
| AR CALUX | Androgen Receptor-CALUX | Androgen receptor activation |
| AS | Active Substance | A substance which exhibits a biocidal, e.g. antimicrobial or insecticidal or rodenticidal effect |
| BP | Biocidal Product | A product consisting of one or more AS's and optionally one or more non-actives ("co-formulants") |
| CALUX | Chemical Activated Luciferase Gene Expression | An effect-based screening method |
| CFU/ml | Colony forming unit | Amount of living bacteria per mililiter |
| C/N | Carbon to Nitrogen | Ratio of Carbon to Nitrogen |
| Cytotox CALUX | Cytotox CALUX | Repression of constitutive transcriptional activation |
| Da | Dalton | Unit of mass |
| RNA | Ribonucleic Acid | Ribonucleic acid is a polymeric molecule essential in various biological roles in coding, decoding, regulation and expression of genes. |
| ECHA | European Chemicals Agency | The European Chemicals Agency is an agency of the EU which manages the EU regulation of Chemicals. |
| ED | Endocrine Disrupting | Endocrine disrupting properties are properties of an endocrine disruptor, which is a chemical that interferes with the body's endocrine system and produces adverse developmental, reproductive, neurological, and immune effects in humans and/or wildlife. |
| EF | Education First | Students spend their time and little pocket money on Brighton pier. |
| EPA | Environmental Protection Agency | The Environmental Protection Agency is an independent agency of the United States federal government for environmental protection |
| eq./g | Equals per gram | Amount of one substance exhibiting the same effect as another substance |
| ERα CALUX | Estrogen Receptor alpha-CALUX | Estrogen receptor a activation |
| EU | European Union | A political and economic union of member states that are located primarily in Europe |
| FIFRA | Federal Insecticide, Fungicide, and Rodenticide Act | The Federal Insecticide, Fungicide, and Rodenticide Act is a United States federal law that set up the basic U.S. system of pesticide regulation to protect applicators, consumers, and the environment |
| HMDA | Hexamethylenediamine | Organic amino compound |
| LC-MS | Liquid Chromatography with Mass Spectrometry | Analytical chemistry technique |
| LD | Lethal Dose | In toxicology, the lethal dose s an indication of the lethal toxicity of a given substance. |
| LOQ | Limit of Quantitation | The lowest concentration of an analyte that can be accurately measured under specified experimental conditions |
| MIC | Minimum Inhibitory Concentration | The lowest concentration of a chemical, which prevents visible growth of a microorganism to be controlled. |
| ng | Nano gram | $10^{-9}$ g |
| N.I. | Not identified | This property was not investigated |
| $OCN_{max}$ | Oxygen Consumption Nitrogen | The maximal oxygen consumption that a specific amount of a defined bacteria pool is consuming for nitrogen metabolism. |
| $OCC_{max}$ | Oxygen Consumption Carbon | The maximal oxygen consumption that a specific amount of a defined bacteria pool is consuming for carbon metabolism. |
| pg | Pico gram | $10^{-12}$ g |
| PHMB | Polyhexamethylene Biguanide | Polymer used as a disinfectant and antiseptic |
| PHMG | Polyhexamethylene Guanidine | Polymer used as a disinfectant and antiseptic |

TABLE 1-continued

List of abbreviations

| Abbreviation | Full Form | Definition |
| --- | --- | --- |
| PPM | Parts per million | A millionth of a piece |
| RPM | Revolutions per Minute | Unit of rotational speed |
| RT | Retention time | Retention time is the amount of time a compound spends in the chromatographic separation column after it has been injected. |
| TBBPA | Tetrabrombisphenol A | A reference compound used in assays |
| TBT | Tributyltin acetate | Compounds used for repression of constitutive transcriptional activation |
| TFA | Trifluoroacetic acid | Organofluorine compound |
| TN | Total Nitrogen | Sum of Nitrogen bound in organic substances, in ammonia and in ammonium ions, as well as oxidized nitrogen (e.g. nitrite, nitrate). |
| TOC | Total Organic Carbon | Amount of covalently bound carbon found in an organic compound |
| TPO | human thyroid peroxidase | Inhibition of thyroid hormone synthesisis determined the human thyroid peroxidase (hTPO) assay. |
| TRβ CALUX | Thyroid receptor | Thyroid receptor-mediated signalling |
| TTR-TRβ CALUX | Transthyretin-Thyroid Receptor beta -CALUX | Transthyretin-Thyroid Receptor beta activation |

Method of Obtaining a Desired Polycondensation Product

There are several synthesis pathways know from the literature for producing a polycondensation product, when using a diamine or polyamine and guanidine as starting materials.

A formula of possible diamines or polyamines is given in formula (I).

(I)

R and R' can be simply hydrogen or alkyl-groups (C1-C6). The spacer "X" may be represented as linear or branched alkylene-groups (C2-C16), which could include heteroatoms like O or N. There is also the possibility of using a cyclic carbon skeleton as a spacer.

Suitable counter-anions for guanidine are salts of inorganic and organic acids, such as chloride, dihydrogen phosphate, carbonate, sorbate, nitrate, acetate, gluconate, citrate and silicate.

A condensation product is obtained by a reaction where 0.5 to 2 moles of guanidine salt, respectively, are used per mole of diamine or polyamine.

After the polycondensation of the product an additional inventive step for a desired polycondensation product begins. An additional amount of guanidine as an end-capping agent has to be added, in order to change the terminating groups of the polycondensation product. Preferably, an amount, which is 8% w/w to 50% w/w of the guanidine hydrochloride-amount, which was used at the beginning of the reaction, has to be added. The exact amount, which should be added at the end of the process, depends on the process-parameters and thus on the chain length of the obtained polycondensation product. The whole process is completed, when the condensation reaction is finished, thus, the ammonia-formation stopped. The in this way obtained product is likely to exhibit a more pronounced antimicrobial efficacy due to the additional source of cationic charge in form of guanidine hydrochloride but of greater importance is that the endocrine disrupting properties are reduced by minimizing the number of terminal amino-groups in the final polycondensation product. This effect is presented in detail in Table 5 (shown below).

Based on the data obtained for endocrine disrupting properties of the herein described polycondensation product, the reason for the ED properties of the prior art-compounds is a combination of the molecular structure and the terminating groups of the polycondensation products. The difference can be seen e.g. by means of in-silico CALUX assays, which will be described in detail in the examples below. Also, the cytotoxicity is significantly reduced as shown in Table 4 (shown below), which is a major advantage compared to prior art-polymers for long-term exposure of e.g. mammals.

Figure 1:
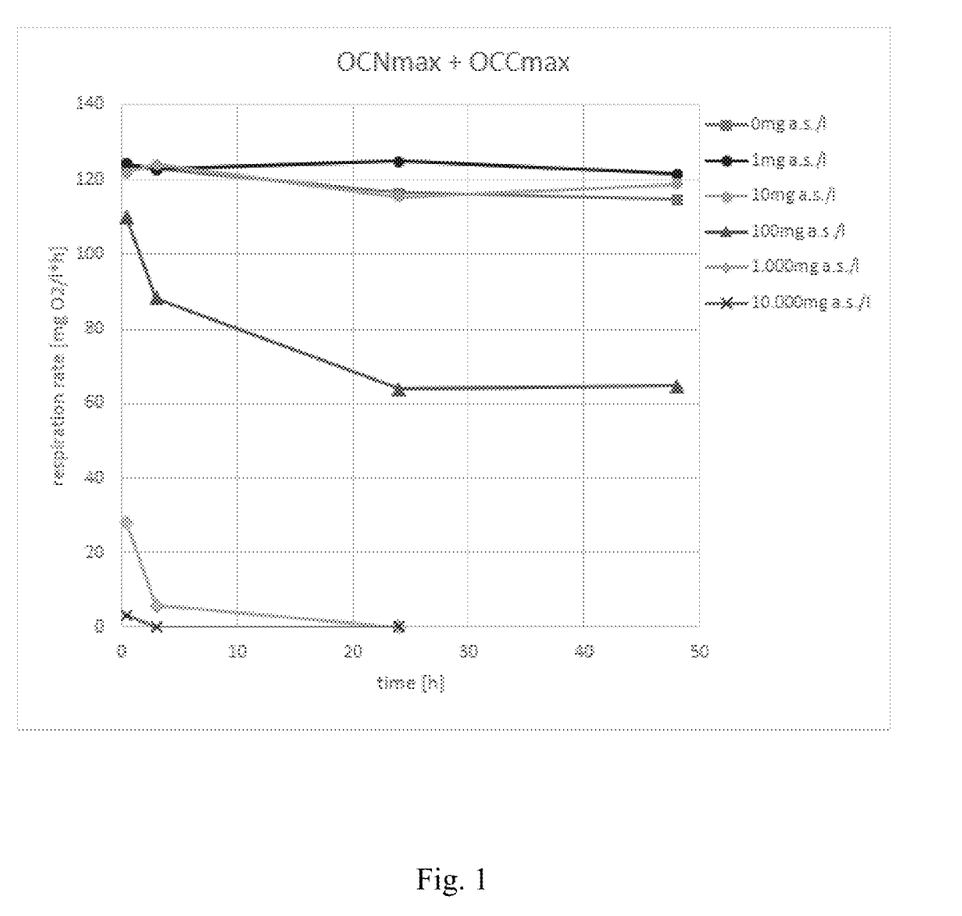
FIG. 1 shows the microbiologically degradable properties (respiration rate versus time) for different concentrations of the novel active biocide.
Figure 2:
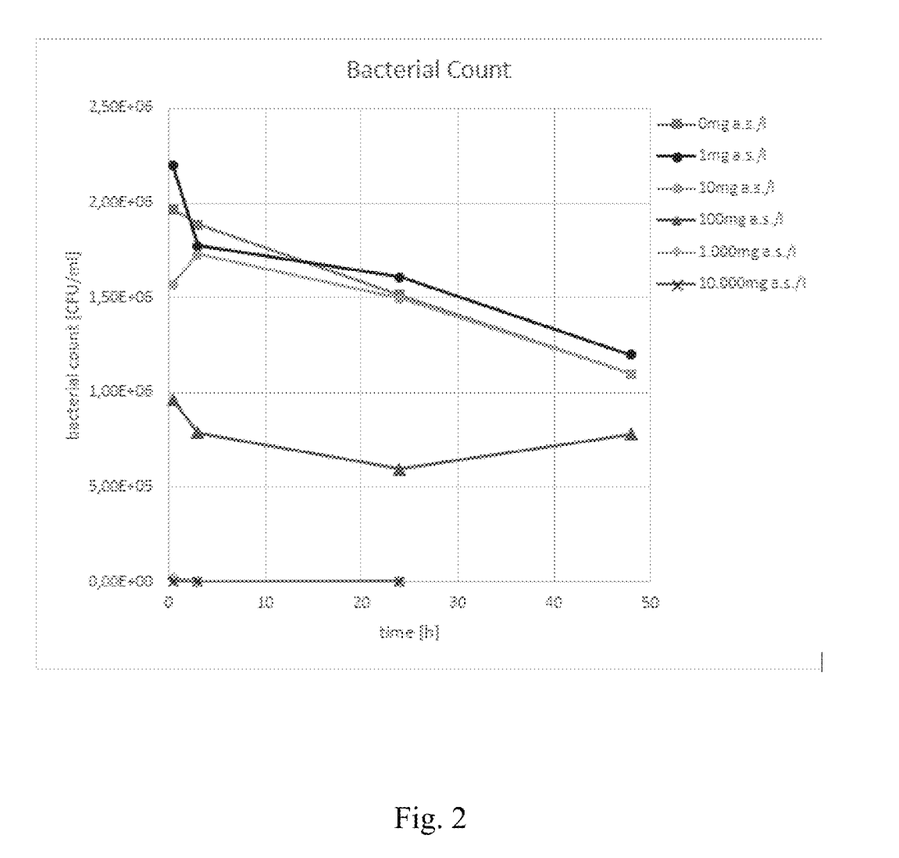
FIG. 2 shows the microbiologically degradable properties (bacterial count versus time) for different concentrations of the novel active biocide.

Within the present invention, the obtained polycondensation product of Example 1 is also microbiologically degradable, which was discovered, when experiments with sewage sludge were carried out (FIG. 1). In the course of this experiments the oxygen-consumption within the sludge was measured. When a compound is added to the sludge, which can be used by the microorganisms as a source of substrate or energy, the oxygen-consumption increases. In fact, this observation could be made for our polycondensation product, revealing that the polymer is biodegradable. The used dosage for this experiment is very important, since a dosage above the lethal dose (LD) of the activated sludge results in a complete inactivation of the microorganisms in the sewage sludge and thus, leads to a negative outcome of this experiment. This can also be seen from FIG. 2.

EXAMPLES

In Comparative Example 1, Example 1 and Comparative Example 2, the starting materials are A, B and C, wherein A is triethylene glycol diamine (Molar mass: 148 g/mol)B is hexamethylenediamine (Molar mass: 116 g/mol) (HMDA) and C is guanidine hydrochloride. The number of hours of heating the mixture of A, B and C after adding A, B and C in a reaction vessel is t1, and the number of hours of heating of A, B, C and C* after the addition of C* to a pre-mixed mixture of A, B and C in the reaction vessel is t2, wherein C* is an end-capping agent. In Example 1, C* is guanidine hydrochloride, though any similar end-capping agent could be added in excess to produce the novel biocidal product of an embodiment herein.

Comparative Example 1

Using the process described in patent WO2006047800A, an active substance bearing statistically 50% terminal amine groups (when disregarding cyclic structures), was obtained.

A water-soluble polycondensation product was obtained by a reaction of 1 mol of guanidine hydrochloride and a mixture of 0.75 mol of hexamethylene diamine and 0.25 mol of triethylene glycol diamine.

37 g (0.25 mol) of liquid triethylene glycol diamine (Molar mass: 148 g/mol) and 87 g (0.75 mol) HMDA (Molar mass: 116 g/mol) are introduced at room temperature into a 100 ml-three-necked flask equipped with a mechanic stirrer and an air cooler. Subsequently, 96.5 g (1 mol) of powdered guanidine hydrochloride (Molar mass: 96.5 g/mol) are added into the flask. The flask with the reaction mass is dipped into an oil bath with a temperature controller. The reaction mass was heated to 140° C. under constant stirring in one hour and subsequently, was kept under these conditions for one hour. Thereafter, the temperature was raised to 170° C. under stirring in one hour and was kept at said temperature for another hour.

Subsequently vacuum was carefully applied and the reaction mass was stirred for another hour at 170° C. under reduced pressure. From the first minute of heating the reaction mixture as indicated, an intense release of ammonia (coloration of pH-indicator paper) occurs, demonstrating the progress of the reaction and taking place of the polycondensation. In the course of the reaction, the reaction mass becomes viscous, and foam formation can thereby be observed visually. The reaction mixture gradually transforms into a resin of a yellowish colour. Once the gas release of ammonia has been finished almost completely, the reaction is completed and the flask was cooled and diluted with water to a desired concentration.

The moles of triethylene glycol, HMDA and guanidine hydrochloride added to the reaction mixture in Comparative Example 1 were in a stoichiometric amount.

Example 1

A water-soluble polycondensation product was obtained by a reaction of 1 mol of guanidine hydrochloride and a mixture of 0.75 mol of HMDA and 0.25 mol of triethylene glycol diamine. As an end capping agent an additional amount of 0.0833 mol of guanidine hydrochloride is used.

37 g (0.25 mol) of liquid triethylene glycol diamine (Molar mass: 148 g/mol) and 87 g (0.75 mol) HMDA (Molar mass: 116 g/mol) are introduced at room temperature into a 100 ml-three-necked flask equipped with a mechanic stirrer and an air cooler. Subsequently, 96.5 g (1 mol) of powdered guanidine hydrochloride (Molar mass: 96.5 g/mol) are added into the flask. The flask with the reaction mass is dipped into an oil bath with a temperature controller. The reaction mass was heated to 140° C. under constant stirring in one hour and subsequently, was kept under these conditions for one hour. Thereafter, the temperature was raised to 170° C. under stirring in one hour and was kept at said temperature for another hour.

Subsequently vacuum was carefully applied and the reaction mass was stirred for another hour at 170° C. under reduced pressure. From the first minute of heating the reaction mixture as indicated, an intense release of ammonia (coloration of pH-indicator paper) occurs, demonstrating the progress of the reaction and taking place of the polycondensation. In the course of the reaction, the reaction mass becomes viscous, and foam formation can thereby be observed visually. The reaction mixture gradually transforms into a resin of a yellowish color. Once the gas release of ammonia has been finished almost completely, the reaction is completed and the end capping agent is introduced to the polycondensation reaction. Again, an intense release of ammonia (coloration of pH-indicator paper) occurs. After 1 to 4 hours or until the development of ammonia has stopped almost completely, the reaction is quenched by cooling the flask and diluting the final polymer with water to the desired concentration.

The moles of triethylene glycol, HMDA and guanidine hydrochloride added to the reaction mixture in Example 1 were in a non-stoichiometric amount with guanidine hydrochloride being in excess by an excess by about 0.1 mol per mol guanidine hydrochloride as per the stoichiometric amount.

Comparative Example 2

A water-soluble polycondensation product was obtained by the reaction of 2.00 mol of guanidine hydrochloride and a mixture of 0.75 mol of HMDA and 0.25 mol of triethylene glycol diamine.

37 g (0.25 mol) of liquid triethylene glycol diamine (Molar mass: 148 g/mol) and 87 g (0.75 mol) HMDA (Molar mass: 116 g/mol) are introduced at room temperature into a three-necked flask, equipped with a mechanic stirrer and a distilling apparatus. Subsequently, 193 g (2 mol) of powdered guanidine hydrochloride (Molar mass: 96.5 g/mol) are added into the flask. The flask with the reaction mass is dipped into an oil bath with a temperature controller. The reaction mass was heated to 140° C. under constant stirring in one hour and subsequently, was kept under these conditions for one hour. Thereafter, the temperature was raised to 170° C. under stirring in one hour and was kept at said temperature for another hour.

Subsequently vacuum was carefully applied and the reaction mass was stirred for another hour at 170° C. under reduced pressure. From the first minute of heating the reaction mixture as indicated, an intense release of ammonia (coloration of pH-indicator paper) occurs, demonstrating the progress of the reaction and taking place of the polycondensation. In the course of the reaction, the reaction mass becomes viscous, and foam formation can thereby be observed visually. The reaction mixture gradually transforms into a resin of a yellowish colour. Once the gas release of ammonia has been finished almost completely, the reaction is completed and the flask was cooled and diluted with water to a desired concentration.

The moles of triethylene glycol, HMDA and guanidine hydrochloride added to the reaction mixture in Comparative Example 2 were in a non-stoichiometric amount with guanidine hydrochloride being in excess by an excess by 1 mol per mol diamine as per the stoichiometric amount.

The values of C/N, viscosity (mm$^2$/s) and pH of the product of polycondensation of Comparative Examples 1 and 2, and Example 1 are shown in Table 2. The C/N value of Example Comparative Examples 1 and 2 is less than 2 while that of Example 1 is more than 2.

When the double amount of guanidine hydrochloride is used in Comparative Example 2 in comparison to Example 1, substantially no long-chain polymers are formed. On the contrary, just very short fragments was obtained. These structural features lead to lower viscosity of the product of Comparative Example 2 versus Example 1 (see Table 2), a very unfavourable minimal inhibitory concentration (MIC) (see Table 3) and poor cytotoxicity and ED properties (see Table 4 and Table 5).

TABLE 2

Analysis

|  | Comparative Example 1 | Example 1 | Comparative Example 2 |
|---|---|---|---|
| C/N | 1.95 | 2.11 | 1.62 |
| Viscosity mm$^2$/s | 3.38 | 5.62 | 2.01 |
| pH | 10.2 | 9.6 | 5.8 |

Table 2 shows that the viscosity of the product of Example 1 is higher than that of the products of Comparative Example 1 and Comparative Example 2. The higher viscosity of the product of Example 1 versus the product of Comparative Example 2 is explained above as resulting from the addition of guanidine hydrochloride in excess by 1 mol per mol guanidine hydrochloride as per the stoichiometric amount in the reaction mixture of Comparative Example 2. However, totally unexpectedly, the product of Example 1 has a higher viscosity than that of the product of Comparative Example 1 even though guanidine hydrochloride is in excess by about 0.1 mol per mol guanidine hydrochloride as per the stoichiometric amount in the reaction mixture of Example 1.

Table 2 also shows that the C/N value of the product of Example 1 is higher than that of Comparative Example 1 and Comparative Example 2. This result is also totally unexpected as one would expect a linear trend between C/N values and amounts of guanidine hydrochloride in the reaction mixture.

TABLE 3

MIC Values (μg/ml) in ppm for specific microorganisms

| Microorganisms | Comparative Example 1 | Example 1 | Comparative Example 2 |
|---|---|---|---|
| *Staphylococcus aureus* ATCC 6538 | 0.5 | 1 | 16 |
| *Staphylococcus aureus* MRSA DSM 18827 | 0.5 | 0.5 | N.I. |
| *Pseudomonas Aeruginosa* ATCC 9027 | 16 | 4-8 | N.I. |
| *Legionella pneumophila* ATCC 33152 | N.I. | 4 | N.I. |
| *Escherichia coli* ATCC 4352 | 4 | 2 | N.I. |
| *Candida Albincans* ATCC 1023 | 4 | 16 | N.I. |
| *Aspergillus Niger* ATCC 6275 | 8 | 8-16 | N.I. |
| *Acinetobacter baumanii* ATCC 19606 | N.I. | 4 | N.I. |

TABLE 4

Cytotoxicity

|  | Test Protocol | Comparative Example 1 | Example 1 | Comparative Example 2 |
|---|---|---|---|---|
| Cytotox CALUX [ng TBT eq./g sample] | JRCStandard197* OECD TG 455** | 0.03 | non-active | 1.8 |

*Joint Research Center Automated CALUX Reporter Gene Assay Procedure, Protocol No. 197: Protocol For Reporter Gene Assays For The Detection of Nuclear Hormone Receptor Modulation, or The Activation of Cell Signaling Pathways, Using High Throughput Screening (2017).
**OECD TG 455: Test No. 455: Performance-Based Test Guideline for Stably Transfected Transactivation In Vitro Assays to Detect Estrogen Receptor Agonists and Antagonists (2016).
^OECD 458: Test No. 458: Stably Transfected Human Androgen Receptor Transcriptional Activation Assay for Detection of Androgenic Agonist and Antagonist Activity of Chemicals (2016).
^^OECD 456: Test No. 456: H295R *Steroidogenesis Assay* (2011).

TABLE 5

ED properties via CALUX assays

|  | Test Protocol | Comparative Example 1 | Example 1 | Comparative Example 2 |
|---|---|---|---|---|
| Steroidogenesis ERα CALUX | OECD TG 455** | N.I. | non-active | N.I. |
| ERα CALUX [estradiol eq./g sample] | OECD TG 455** | non-active | non-active | active |
| AR CALUX | OECD 458^ | N.I. | non-active | active |
| Anti ERrα CALUX |  | N.I. | non-active | N.I. |
| Steroidogenesis AR CALUX | OECD 456^^ | N.I. | non-active | N.I. |
| anti-AR CALUX [ng Flutamide eq./g sample] | OECD 458^ | active | non-active | N.I. |
| TRβ CALUX [ng Triiodothyronine eq./g sample] | JRC Standard 197* | non-active | non-active | N.I. |
| anti-TRβ CALUX [μg Deoxynivalenol eq./g sample] | JRC Standard 197* | active | non-active | N.I. |
| TTR-TRβ CALUX [ng TBBPA eq./g sample] | JRC Standard 197* | active | non-active | active |
| TPO [ng Methimazole eq./g Sample] | JRC Standard 197* | non-active | non-active | N.I. |

*/**/^/^^See footnotes below Table 4.

CALUX Assay Procedure and Principle

CALUX® assays may be used for testing of compounds as well as complex mixtures. The cells are cultured in well plates (usually 96 or 384 wells), which allows for increased throughput and automated handling. Subsequently, they are exposed to a dilution series of the test compound or a dilution series of an extract of the test sample. Along with the test samples, the cells are also exposed to a concentration series of a reference compound. After a certain exposure time, the light production in the independent wells is quantified. The activity evoked by the test compound or test sample is subsequently derived by interpolation in the response curve of the reference compound and is expressed in equivalences of this reference compound.

Figure 3:
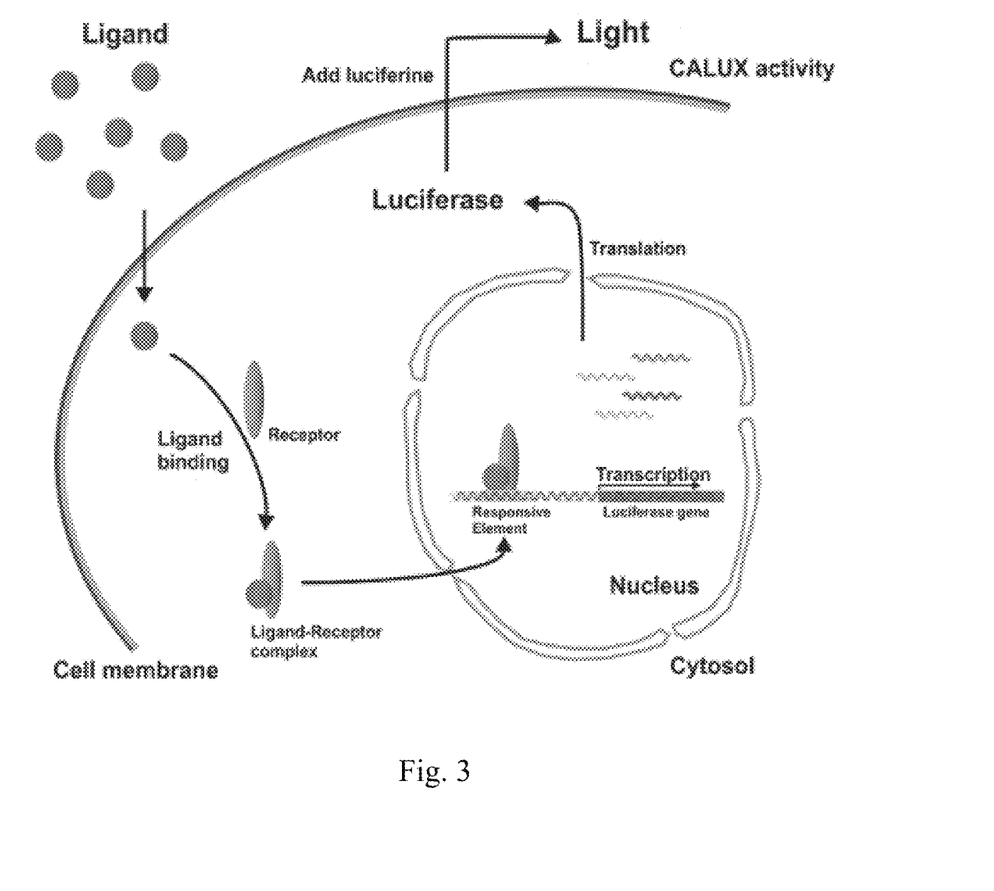
FIG. 3 shows CALUX assay mechanism inside biological cell.

Mammalian cells possess a wide range of mechanisms with which they can specifically respond to signals or stresses evoked by compounds they are confronted with. CALUX (Chemically Activated LUciferase eXpression) assays form a panel of mammalian cell lines that were modified to produce a quantifiable response in addition to this natural response: If a cell is triggered to generate a response, a reporter gene (luciferase) is transcribed and translated into an enzyme that produces light during a reaction it catalyses. After addition of a substrate (luciferine), light production is quantified using a luminometer as shown in FIG. 3. The produced signal is proportional to the evoked effect.

Most cellular responses are mediated by a regulatory protein, which is a sensor that detects a certain event and subsequently incites the cellular response to this event. The regulator binds to a specific regulatory element which is present in RNA regions upstream of genes involved in the response. In the CALUX cell lines these regulatory elements were also placed in front of the luciferase (reporter) gene. Thereby, the production of the corresponding luciferase enzyme is coupled to the natural response of the cell.

Whereas most genes may be involved in multiple responses, the molecular design of the CALUX assays ensures that the observed response is highly specific for the effect of interest.

All cited references, including patents, patent application publications and other publications, are incorporated herein in their entirety by reference.

What is claimed is:

1. A polymeric product comprising:
   a molecule comprising an oxyalkylene diamine, an alkylene diamine, and a guanidine or a salt thereof, wherein the guanidine or the salt thereof is in more than a stoichiometric ratio;
   wherein the polymeric product has: (i) a ratio of C to N (C/N) greater than 2; (ii) a molecular weight in a range of 100 Da to 700 Da, and (iii) a cytotoxicity less than 0.03 ng tributyltin acetate eq./g;
   wherein the oxyalkylene diamine comprises a compound of a formula: $NH_2[(CH_2)_2O]_n(CH_2)_2NH_2$ wherein n is an integer between 2 and 5, wherein the alkylene diamine comprises a compound of a formula: $NH_2(CH_2)_nNH_2$ wherein n is an integer between 2 and 10;
   wherein over 50% by weight of the molecule has the guanidine or the salt thereof at a terminal position of the molecule.

2. The polymeric product of claim 1, wherein over 90% by weight of the molecule has the guanidine or the salt thereof at the terminal position of the molecule.

3. The polymeric product of claim 1, wherein the polymeric product has a bactericidal activity and yeasticidal activity.

4. The polymeric product of claim 1, wherein the polymeric product is microbiologically degradable.

5. The polymeric product of claim 1, wherein the salt comprises a hydrochloride salt of the guanidine.

6. The polymeric product of claim 1, wherein the oxyalkylene diamine comprises a triethylene glycol diamine, a polyoxypropylene diamine and/or a polyoxyethylene diamine.

7. The polymeric product of claim 1, wherein the polymeric product has no significant endocrine disrupting properties.

8. The polymeric product of claim 1, wherein the polymeric product is a cationic polymer, wherein the polymeric product has an antimicrobial efficacy.

9. The polymeric product of claim 1, wherein the polymeric product is an ingredient of a biocidal product, a plant protection product or a medical device.

10. The polymeric product of claim 1, wherein the polymeric product is an ingredient of a biocidal product.

11. The polymeric product of claim 1, wherein the molecule comprises the oxyalkylene diamine, the alkylene diamine, and the guanidine or the salt thereof in the stoichiometry ratio.

12. The polymeric product of claim 1, wherein the polymeric product has a viscosity in $mm^2/s$ of more than 5.

* * * * *